United States Patent [19]
Cassidy

[11] 3,900,331
[45] Aug. 19, 1975

[54] PHOSPHATIC MATERIALS
[75] Inventor: John Edward Cassidy, Runcorn, England
[73] Assignee: Imperial Chemical Industries Limited, London, England
[22] Filed: Oct. 12, 1972
[21] Appl. No.: 296,984

[30] Foreign Application Priority Data
Oct. 19, 1971  United Kingdom............... 48574/71
Feb. 21, 1972  United Kingdom................ 7844/72

[52] U.S. Cl.................................... 106/85; 106/65
[51] Int. Cl.²....................................... C04B 19/00
[58] Field of Search...................... 106/65, 85, 108.5

[56] References Cited
UNITED STATES PATENTS
2,219,583  10/1940  Bogart ............................. 106/108.5
2,425,151  8/1947  Greger .............................. 106/108.5
2,444,347  6/1948  Greger et al. ..................... 106/108.5
2,455,758  12/1948  Greger .............................. 106/108.5
3,658,563  4/1972  Washio et al. ........................ 106/65

*Primary Examiner*—J. Poer
*Attorney, Agent, or Firm*—Cushman, Darby & Cushman

[57] ABSTRACT

A solid water-soluble aluminum phosphate binder is prepared by spray-drying or freeze-drying a solution containing aluminum ions, phosphate ions and additionally the anions of a mineral acid other than phosphoric acid or of a carboxylic acid, the aluminum ions and phosphate ions being present in solution in a ratio of substantially 1:1.

13 Claims, No Drawings

PHOSPHATIC MATERIALS

This invention relates to certain aluminium phosphates, useful as refractory binders, and to their production in solid form by spray- or freeze-drying.

Hitherto, aluminium binders have been supplied to the industry in solution form. The solutions are highly corrosive and, in consequence, require special precautions in handling and storage.

We have now found, surprisingly, that certain aluminium phosphate binders can be provided in a conveniently handled solid form by spray- or freeze-drying solutions of aluminium phosphate. Spray-drying has been used for the drying of solutions of inorganic materials, for example alkali-metal phosphate fertilsers, but has not hitherto been found applicable to the production of refractory binders.

According to the present invention there is provided a process for the preparation of a solid water-soluble aluminium phosphate which comprises spray- or freeze-drying a solution containing aluminium ions, phosphate ions and additionally the anions of a mineral acid (other than phosphoric acid) or of a carboxylic acid, the aluminium ions and phosphate ions being present in solution in a ratio of substantially 1:1.

The ratio of aluminium ions to phosphate ions is preferably almost exactly 1:1, for example in the range 0.9:1 to 1.1:1, but may vary somewhat, for example to a value in the range 1.25:1 to 0.75:1. The ratio of aluminium ions to phosphate ions remains unchanged in the drying process and consequently the solid binders produced contain aluminium ions and phosphate ions in a ratio of substantially 1:1. This is advantageous since binders having this composition form, on curing, a product having better refractory properties than the acid aluminium phosphate binding solutions referred to above.

The solution is conveniently an aqueous solution although solutions in organic solvents, for example alcohols, may be used. If desired, a mixture of solvents may be used, for example a mixture of water and alcohol.

The additional anions serve to render the aluminium phosphate soluble. Surprisingly, at least a proportion of the anions in the starting solution are carried over into the dried product and serve to render the product soluble.

Examples of anions which may be used are halide (especially chloride), nitrate, sulphate, formate and acetate anions, the anions of the monobasic mineral acids being especially preferred as when they are used, the dry products formed are binders which are readily cured at low temperature. If desired, a mixture of the anions may be used.

The proportion of additional anions required will vary depending upon the aluminium:phosphate ratio and the particular anion chosen, although an anion-:aluminium ratio of about 1:1 is generally preferred in the product. If the ratio is substantially less than this, the product is not so readily soluble, whilst if the ratio is higher than this, solutions of the product become more corrosive without a significant compensating improvement in the solubility of the product. The preferred proportion of anion can readily be determined by simple trial in any particular case. For example, when the anion is halide (for example chloride), the products desirably have a halide ion to aluminium ion ratio of 0.7 to 1.2, preferably 0.9 to 1.1. Since halide ions (but not aluminium ions) may be lost in the drying process, the halide ion to aluminium ion ratio in the starting solution should be greater than or equal to the ratio desired in the product. Thus the starting solution may have a halide ion to aluminium ion ratio in the range 3:1 (or greater) to about 1:1. Surprisingly, we have found that, when the ratio in the starting solution is substantially greater than 1:1, a substantial proportion of chloride is lost in the drying process so that the product consistently has a halide ion to aluminium ion ratio of about 1:1. Nevertheless, products of this ratio has also been obtained from starting solution having a halide ion to chloride ion of any about 1:1.

By way of further example, when the anion is the nitrate anion, the products desirably have a nitrate ion to aluminium ion concentration in the range 0.7 to 1.2, preferably 0.9 to 1.1. Again the starting solution may, but need not necessarily, contain excess of the anions.

The starting solution may be prepared by any method which ensures that the desired ions are present. For example, it may be conveniently prepared by dissolving the aluminium phosphate in aqueous hydrochloric, hydrobromic, nitric, formic, acetic or sulphuric acid or a mixture thereof, for example by dissolving aluminium orthophosphate trihydrate in aqueous hydrochloric acid, The solution may also be prepared by dissolving a salt of aluminium, for example the chloride, bromide, nitrate, formate, acetate or sulphate of aluminium in phosphoric acid, especially aqueous orthophosphoric acid, or by mixing a solution of the said acid salt with orthophosphoric acid. It may be found convenient to prepare the solution by dissolving the aluminium or compounds of aluminium other than the said salts in a mixture of phosphoric acid and at least one of the said aqueous acids; the oxides and hydroxides of aluminium are especially useful compounds, and aluminium oxide-bearing minerals, for example alumino-silicates, may be used. Alternatively, some of the solutions may be prepared by reacting the aluminium phosphate, oxide or hydroxide and a salt of aluminium and hydrochloric acid, hydrobromic acid, nitric acid, formic acid, acetic acid or sulphuric acid in aqueous solution; for example, a useful solution may be prepared by mixing aluminium dihydrogen phosphate, $Al(H_2PO_4)_3$, with aluminium chloride, $AlCl_3$, and, optionally, aluminium hydroxide, $Al(OH)_3$, in water. If desired, separate solutions may be made up and mixed. Preparation of the solution is frequently assisted by warming or, in some cases, boiling, although conditions that result in the precipitation of an insoluble aluminium phosphate should clearly be avoided.

The total concentration of ions in solution is not critical but, for reasons of economy, will usually be high. Thus, for example, the solution used may have a solids content in the range 20 to 50 per cent by weight, or even higher if possible. In some cases, it may be preferred to use a relatively dilute starting solution as, for example, when one of the source materials (for example hydrochloric acid) is most readily available in the form of a dilute solution.

The properties of the solution may be modified by techniques known to improve suitability of solutions for spray-drying. Thus one or more known additives known to assist in the spray-drying operation may be included in the solution provided that they do not react deleteriously with other components of the solution. For example, additives may be included in the solution to modify its viscosity and/or surface tension in desired manner. Similarly additives that modify the properties of the spray-dried product, for example by increasing its solubility or rate of solution or improving its flow properties as a solid, may be included in the solution provided that they do not interfere unduly with the spray-drying operation. Such additives are preferably dissolved in the solution but may, if desired, be suspended in the form of particles.

In preferred spray-drying methods, the solution is fed to an atomiser so that a mist-like spray of droplets is formed. The droplets usually have diameters in the range 10 to 500 microns, preferably 20 to 100 microns. The atomiser may take any convenient form, for example it may be in the form of a suitable spray nozzle, or an array of such nozzles, or it may be in the form of a spinning disc. Because of the corrosive nature of the solution to be dried, the atomiser is desirably constructed of corrosive-resistant material, for example titanium. Solution is discharged from an atomiser into a chamber, preferably a chamber maintained at atmospheric pressure, in which a gas is flowing. The gas used is preferably air, but other gases may be employed, for example nitrogen, argon or carbon dioxide. If desired, a mixture of gases may be used. The gas used may include one or more gaseous components, for example water vapour, hydrogen chloride or steam, which equilibrate or react with the droplets of drying solution or solid in the spray. The gas may also contain fine particles which it is desired to incorporate into the product. The gas is used to supply at least part of the heat required to effect dehydration of the solution in the same chamber. The temperature in the interior of the chamber is conveniently maintained at a desired level by control of the inlet temperature of the gas and/or the feed rate of the solution to the atomiser.

The temperature of the drying droplets in the spray-drier should be controlled so that decomposition of the product (that is, loss of such a large proportion of additional anion that the product becomes insoluble) is avoided. The temperature at which the product decomposes (loses solubility) will depend on the particular anions present, but will frequently be 120°C or below. The conditions required to give a soluble product in any particular case may be determined by simple trial.

When using a co-current spray-drier, the inlet temperature of the gas is not critical, and may be, for example, in the range 40° to 300°C, especially 200° to 240°C. The outlet temperature should not be above the temperature at which the product loses solubility. For example, if the anions present are chloride anions, the outlet temperature should desirably not exceed 100°C and is preferably in the range 70° to 100°C, depending on the concentration of chloride ions present in solution. If the anions present are nitrate anions, the outlet temperature should desirably not exceed 90°C and is preferably in the range 70° to 90°C, depending on the concentration of nitrate ions present in solution. When using a counter-current spray-drier, control of the gas inlet temperature is more important and the temperature of the inlet gas should be controlled in accordance with the figures given above for the outlet temperature in a co-current spray-drier.

The spray-drier may conveniently be operated at atmospheric pressure, although higher or lower pressures may be used if desired.

The invention also provides a process in which the specified solution is freeze-dried. The preferred conditions for freeze-drying will vary depending upon the precise composition of the solution to be dried, but in any given case may be readily determined by simple trial.

As already noted, the binders produced by the method of the present invention have important advantages over the liquid acid aluminium phosphate binders hitherto in use. They also have the following advantageous characteristics:

1. the binder is in the form of a dry free-flowing powder,
2. it is readily soluble in water,
3. the solid binders (even those containing chlorine) are practically odourless,
4. refractory cements prepared from the binders have good properties of refractoriness and resistance to slag erosion.

In our co-pending UK Pat. application No. 29862/69 (Dutch Pat. application No. 7008594) we have described novel complex phosphates of aluminium containing chemically-bound water and halogen and, in particular, we have described the preparation of a crystalline compound of formula $AlPClH_{11}O_9$. We have found that by spray-drying solutions in accordance with the invention we are able to obtain binders of comparable empirical formula, although the composition of the binders varies depending upon the conditions of preparation. In general, the spray-dried binder tends to contain less water than the specific binders of the earlier patent application. Thus, according to a preferred aspect of the invention there is provided a water-soluble spray-dried aluminium phosphate having a chemical composition which can be written in the form

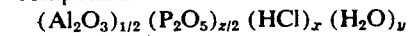
$(Al_2O_3)_{1/2} (P_2O_5)_{z/2} (HCl)_x (H_2O)_y$ .

wherein $z$ is in the range 0.8 to 1.2, preferably 0.9 to 1.1
$x$ is in the range 0.8 to 1.2, preferably 0.9 to 1.1
$y$ is in the range 3 to 6, preferably 3 to 4 when $z = 1$, the formula reduces to:

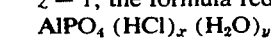
$AlPO_4 (HCl)_x (H_2O)_y$ wherein $x$ and $y$ are as above defined.

The invention is illustrated but not limited by the following Examples:

EXAMPLE 1

174.5g (1 mole) of aluminium hydroxychloride $Al_2(OH)_5Cl$ were dissolved in 663g of water and 104g of 35% aqueous hydrochloric acid (1 mole) added with stirring. The temperature of the mixture rose by 10°C. 223g of 88% aqueous orthophosphoric acid (2 moles) were then added; the temperature rose 18°C and a clear water-white solution was formed. The solution was dehydrated in a co-current spray-drier having a spinning disc atomiser and a chamber at atmospheric pressure. Air inlet temperature was 190°C and air outlet temperature was 80°–85°C. A white powder was produced, more than 95% of which was water soluble, and which had the following analysis:

| | Al | Cl | PO$_4$ | H$_2$O |
|---|---|---|---|---|
| % by weight | 10.9 | 10.7 | 38.7 | 39.4 |
| proportion | 1.00 | 0.75 | 1.00 | 5.4 |

EXAMPLE 2

A solution was prepared as described in Example 1, was spray-dried by passing it through the same 1, at the same pressure as described in Example 1, but at an air inlet temperature of 190°C and an air outlet temperature of 65°C. A white water-soluble product was obtained having the following analysis:

|  | Al | Cl | PO$_4$ | H$_2$O |
|---|---|---|---|---|
| % by weight | 10.1 | 14.6 | 38.5 | 36.4 |
| proportion | 1.00 | 1.10 | 1.08 | 5.4 |

EXAMPLE 3

176g of aluminium phosphate trihydrate were slowly dissolved in a mixture of 20g of concentrated hydrochloric acid and 200 ml of water. The resultant solution was pale yellow and had the following analysis:

|  | Al | Cl | PO$_4$ | H$_2$O |
|---|---|---|---|---|
| % by weight | 4.6 | 13.0 | 16.0 | 62.0 |

The solution was spray-dried as in Example 1 but at an air inlet temperature of 139°C and an air outlet temperature of 69°C. A white water-soluble powder was produced having the following analysis:

|  | Al | Cl | PO$_4$ | H$_2$O |
|---|---|---|---|---|
| % by weight | 11.6 | 16.5 | 40.4 | 31.2 |
| proportion | 1.00 | 1.07 | 0.99 | 4.0 |

EXAMPLE 4

A solution as prepared in Example 3 was spray-dried at atmospheric pressure and an inlet air temperature of 180°C and an air outlet temperature of 100°C. A cream-coloured water-soluble powder was produced having the following analysis:

|  | Al | Cl | PO$_4$ | H$_2$O |
|---|---|---|---|---|
| % by weight | 12.1 | 16.5 | 42.1 | 28.6 |
| proportion | 1.00 | 1.02 | 0.99 | 3.2 |

EXAMPLE 5

133.5g of anhydrous aluminium chloride were slowly dissolved in 300 ml of water. To the resulting solution were added 110g of 89% orthophosphoric acid. The resultant yellow liquid had the following analysis:

|  | Al | Cl | PO$_4$ | H$_2$O |
|---|---|---|---|---|
| % by weight | 6.3 | 20.4 | 21.8 | 48.9 |

The solution was spray-dried at atmospheric pressure, an air inlet temperature of 140°C and an air outlet temperature of 70°C. A yellow water-soluble powder was produced having the following analysis:

|  | Al | Cl | PO$_4$ | H$_2$O |
|---|---|---|---|---|
| % by weight | 11.4 | 17.4 | 39.3 | 30.0 |
| proportion | 1.00 | 1.10 | 1.12 | 4.0 |

EXAMPLE 6

A solution prepared as in Example 5 was spray-dried at the same air pressure but at an air inlet temperature of 180°C and an air outlet temperature of 100°C. A yellow water-soluble powder was produced, with the following analysis:

|  | Al | Cl | PO$_4$ | H$_2$O |
|---|---|---|---|---|
| % by weight | 12.6 | 14.9 | 44.3 | 27.4 |
| proportion | 1.00 | 0.91 | 1.00 | 3.3 |

EXAMPLE 7

881g of anhydrous aluminium chloride were dissolved in 2000g of water. To this solution 410 ml of 89% orthophosphoric acid were added. The resultant solution was then spray-dried as in Example 1 using an inlet temperature of 235°C and an outlet air temperature of 104°C.

A pale yellow water-soluble solid having the following analysis was formed:

|  | Al | Cl | PO$_4$ | H$_2$O |
|---|---|---|---|---|
| % by weight | 13.2 | 13.2 | 46.4 | 27.5 |
| proportion | 1.00 | 0.77 | 1.00 | 3.1 |

EXAMPLE 8

720g of aluminium hydroxide were dissolved in a mixture of 1712 ml of 36% hydrochloric acid and 560 ml of 89% orthophosphoric acid. The resultant solution was spray-dried as in Example 1 using an air inlet temperature of 230°C and an air outlet temperature of 106°C.

The solid produced was soluble in water and had the following chemical analysis:

|  | Al | Cl | PO$_4$ | H$_2$O |
|---|---|---|---|---|
| % by weight | 13.0 | 13.2 | 44.2 | 28.6 |
| proportion | 1.00 | 0.78 | 0.96 | 3.3 |

EXAMPLE 9

176g (1 mole) of trialuminium phosphate trihydrate were mixed with 114g of a 32% aqueous hydrochloric acid solution (1 mole) and sufficient water to form a stiff paste at a temperature of 60°C. The mix was cooled to room temperature and allowed to stand for 48 hours; sufficient water was added to make up the total added water to 472g. The slightly cloudy solution formed was filtered and the filtrate spray-dried as described in Example 1 using an air inlet temperature of 190°C and an air outlet temperature of 65°–70°C.

The product was a pale yellow water-soluble powder having the following analysis:

|  | Al | Cl | PO$_4$ | H$_2$O |
|---|---|---|---|---|
| % by weight | 10.9 | 15.0 | 39.4 | 34.1 |
| proportion | 1.00 | 1.04 | 1.02 | 4.7 |

EXAMPLE 10

A solution was prepared as in Example 7 and then spray-dried as in Example 1 at an inlet air temperature of 200°C and an outlet air temperature of 100°C.

The solid product formed was soluble in water and had the following chemical analysis:

|  | Al | Cl | PO$_4$ | H$_2$O |
|---|---|---|---|---|
| % by weight | 11.7 | 16.2 | 41.1 | 30.9 |
| proportion | 1 | 1.05 | 1.00 | 4.0 |

EXAMPLE 11

133.5g of anhydrous aluminium chloride were dissolved in 1 litre of 75° O.P. industrial methylated spirit. To this solution 63.6 ml of 88% orthophosphoric acid were added. A white precipitate separated from solution and this was redissolved in the mother liquor by the addition of 100 ml of water. The solution had the following analysis:

|  | Al | Cl | PO$_4$ |
|---|---|---|---|
| % by weight | 2.9 | 10.4 | 10.2 |

This solution was then spray-dried in a co-current spray-drier with a gas inlet temperature of 243°C and gas outlet temperature of 57°C. A water-soluble product was formed having the following analysis:

|  | Al | Cl | PO$_4$ | H$_2$O | Ethanol |
|---|---|---|---|---|---|
| % by weight | 11.3 | 12.0 | 40.0 | 23.6 | 6.0 |
| proportion | 1.00 | .83 | 1.00 | 3.1 | 0.37 |

EXAMPLE 12

312g of aluminium nitrate nonahydrate and 93g of 88% orthophosphoric acid were dissolved in 94 ml of redistilled water. The resultant solution was spray-dried as in Example 1 at an inlet temperature of 170°C and an outlet temperature of 80°C.

The solid product formed was highly soluble in water and had the following analysis:

|  | Al | NO$_3$ | PO$_4$ | H$_2$O |
|---|---|---|---|---|
| % by weight | 10.8 | 23.5 | 39.6 | 26.1 |
| proportion | 1.00 | 1.04 | 0.94 | 3.6 |

EXAMPLE 13

An aqueous solution of aluminium nitrate nonahydrate (2410g) and 88% orthophosphoric acid (615g) was prepared. The resulting solution contained approximately 40% by weight of Al(NO$_3$)$_3$ and H$_3$PO$_4$ taken together.

The solution was spray-dried as in Example 1 at an inlet temperature of 235°–240°C and an outlet temperature of 85°–90°C. The product, which was highly soluble in water, had the following analysis:

|  | Al | NO$_3$ | PO$_4$ |
|---|---|---|---|
| % by weight | 12.1 | 25.7 | 36.5 |
| proportion | 1.00 | 0.91 | 0.84 |

EXAMPLE 14

An aqueous solution of aluminium nitrate/phosphoric acid having the analysis:

|  | Al | P | NO$_3$ |
|---|---|---|---|
| % by weight | 4.5 | 5.2 | 30.9 | was made up and spray-dried as described in Example 1. The inlet temperature was 196°C and the outlet temperature was 81°C. A water-soluble white solid having the following analysis was produced:

|  | Al | NO$_3$ | PO$_4$ | H$_2$O |
|---|---|---|---|---|
| % by weight | 12.1 | 21.7 | 42.4 | 23.8 |
| proportion | 1.00 | 0.78 | 1.00 | 3.0 |

EXAMPLE 15

100g of a 50% by weight solution of aluminium chlorohydroxide [Al$_2$(OH)$_5$Cl] were mixed with 26 ml of 36% hydrochloric acid, 33 ml of 88% phosphoric acid and 10 ml of water. Analysis of the solution showed the composition to be:

|  | Al | PO$_4$ | Cl |
|---|---|---|---|
| % by weight | 6.4 | 25.5 | 9.3 |

15g of the solution were placed in a 250 ml round-bottomed flask which was rotated in a trichloroethylene/solid carbon dioxide bath. The bath was removed and the flask connected via a cold finger cooled by trichloroethylene/solid carbon dioxide to a vacuum pump and evacuated to a pressure of 10$^{-4}$ mm Hg. After 4–5 hours, a white translucent solid was formed. The solid was found to be water-soluble and had the following analysis:

|  | Al | PO$_4$ | Cl |
|---|---|---|---|
| % by weight | 10.4 | 41.1 | 14.8 |
| proportion | 1.0 | 1.1 | 1.1 |

EXAMPLE 16

A paste was made up from 11g of trialuminium phosphate (AlPO$_4$) and 30 ml of water, and 5 ml of 69% nitric acid added. A clear solution was formed and 15g of this solution was freeze-dried in the manner described in Example 15. The white solid product formed was found to have the following analysis:

|  | Al | PO$_4$ | NO$_3$ |
|---|---|---|---|
| % by weight | 9.4 | 31.6 | 27.9 |
| proportion | 1.0 | 0.96 | 1.29 |

What we claim is:

1. A process for the preparation of a solid water-soluble aluminium phosphate which comprises spray-drying or freeze-drying a solution containing aluminium ions, phosphate ions and additionally the anions of a mineral acid other than phosphoric acid or of a carboxylic acid, the aluminium ions and phosphate ions being present in solution in a ratio of substantially 1:1.

2. A process as claimed in claim 1 wherein the solution contains aluminium ions and phosphate ions in a ratio in the range 0.9:1 to 1.1:1.

3. A process as claimed in claim 1 wherein the additional anions in the solution are anions of a monobasic mineral acid.

4. A process as claimed in claim 3 wherein the additional anions in the solution are chloride anions.

5. A process as claimed in claim 3 wherein the additional anions in the solution are nitrate anions.

6. A process as claimed in claim 1 wherein the ratio of additional anions to aluminium ions in solution is at least 1:1.

7. A process as claimed in claim 1 wherein the ratio of additional anions to aluminium ions in solution is in the range from about 1:1 to 3:1.

8. A process as claimed in claim 1 wherein the solution is an aqueous solution.

9. A process as claimed in claim 1 wherein a spinning disc atomiser is used.

10. A process as claimed in claim 1 wherein a co-current spray-drier is used.

11. A process as claimed in claim 10 wherein the outlet temperature of the drying gas of the spray-drier does not exceed 100°C.

12. A process as claimed in claim 11 wherein a solution containing chloride ions as additional anions is spray-dried and the outlet temperature of the drying gas is in the range 70° to 100°C.

13. A process as claimed in claim 11 wherein a solution containing nitrate ions as additional anions is spray-dried and the outlet temperature of the drying gas is in the range 70° to 90°C.

* * * * *